US010316664B2

(12) United States Patent
Lummer et al.

(10) Patent No.: US 10,316,664 B2
(45) Date of Patent: Jun. 11, 2019

(54) EXHAUST-GAS TURBOCHARGER

(71) Applicant: Bosch Mahle Turbo Systems GmbH & Co. KG, Stuttgart (DE)

(72) Inventors: Dirk Lummer, Ludwigsburg (DE); Martin Kropp, Albershausen (DE)

(73) Assignee: BMTS Technology GmbH & Co. KG (DE)

( * ) Notice: Subject to any disclaimer, the term of this patent is extended or adjusted under 35 U.S.C. 154(b) by 467 days.

(21) Appl. No.: 15/157,105

(22) Filed: May 17, 2016

(65) Prior Publication Data
US 2016/0341111 A1 Nov. 24, 2016

(30) Foreign Application Priority Data

May 18, 2015 (DE) .................... 20 2015 104 843 U
Sep. 29, 2015 (DE) ........................ 10 2015 218 696
Mar. 11, 2016 (DE) ........................ 10 2016 204 077

(51) Int. Cl.
*F02D 23/00* (2006.01)
*F01D 5/02* (2006.01)
(Continued)

(52) U.S. Cl.
CPC .............. *F01D 5/021* (2013.01); *F02B 33/40* (2013.01); *F02B 37/025* (2013.01);
(Continued)

(58) Field of Classification Search
CPC ...... F02B 37/18; F02B 37/183; F02B 37/186; F02B 37/025; F02B 33/44; F02D 23/02; F05D 2260/606; Y02T 10/144
(Continued)

(56) References Cited

U.S. PATENT DOCUMENTS 1,524,267 A * 1/1925 Loop ....................... F16K 3/184
251/167
6,250,079 B1 * 6/2001 Zander .................. F02B 37/025
60/602
(Continued)

FOREIGN PATENT DOCUMENTS

DE 19853391 A1 5/2000
DE 102007018617 A1 * 10/2007 ............ F02B 37/183
(Continued)

OTHER PUBLICATIONS

Machine Translation of Brinkert (Pub. No. DE 10 2013 002 894 A1), published on Sep. 4, 2014.*
(Continued)

*Primary Examiner* — Thai Ba Trieu
(74) *Attorney, Agent, or Firm* — Fishman Stewart PLLC

(57) ABSTRACT

An exhaust gas turbocharger may include a turbine housing and a turbine arranged in the turbine housing. The turbine housing may include at least two exhaust gas channels and a partition separating the at least two exhaust gas channels from one another. A wastegate valve may be arranged such that the at least two exhaust gas channels are connectable to a bypass duct bypassing the turbine. The wastegate valve may include a valve body and a valve seat interacting with the valve body. The wastegate valve may be configured such that at least one of a ram supercharging operation and a pulse supercharging operation is activated depending on a degree of opening of the wastegate valve.

20 Claims, 5 Drawing Sheets

(51) Int. Cl.
*F02B 37/02* (2006.01)
*F02B 33/40* (2006.01)
*F02B 37/18* (2006.01)
*F02D 23/02* (2006.01)

(52) U.S. Cl.
CPC ............ *F02B 37/183* (2013.01); *F02D 23/02* (2013.01); *F05D 2260/606* (2013.01); *Y02T 10/144* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 6,969,048 | B2* | 11/2005 | Colic | F02B 29/083 251/356 |
| 7,269,950 | B2* | 9/2007 | Pedersen | F01D 17/14 417/406 |
| 8,733,101 | B2* | 5/2014 | Hoshi | F02B 37/183 60/602 |
| 8,984,880 | B2* | 3/2015 | Marques | F02B 37/183 60/602 |
| 10,030,518 | B2* | 7/2018 | Lummer | F02B 37/183 |
| 2005/0086936 | A1 | 4/2005 | Bucknell et al. | |
| 2011/0173974 | A1* | 7/2011 | Grabowska | F02B 37/183 60/602 |
| 2012/0312010 | A1* | 12/2012 | Yasoshima | F02B 37/183 60/602 |
| 2014/0072411 | A1* | 3/2014 | Marques | F02B 37/183 415/144 |
| 2015/0233283 | A1* | 8/2015 | Smiljanovski | F02B 37/025 60/602 |
| 2016/0061208 | A1* | 3/2016 | Marques | F02B 37/183 415/148 |
| 2016/0341109 | A1* | 11/2016 | Lummer | F02B 37/183 |

FOREIGN PATENT DOCUMENTS

| | | | |
|---|---|---|---|
| DE | 102014203084 A1 | 8/2014 | |
| DE | 102013002894 A1 | 9/2014 | |
| DE | 102015011585 A1 | 4/2016 | |
| DE | 102015012727 A1 | 5/2016 | |
| GB | 231930 A | 4/1925 | |
| GB | 2312930 A1 | 11/1997 | |
| JP | 61038275 A * | 2/1986 | ............ F16K 5/222 |
| WO | WO 2017102041 A1 * | 6/2017 | ............ F02B 37/183 |
| WO | WO 2017207081 A1 * | 12/2017 | ............ F02B 37/183 |

OTHER PUBLICATIONS

English abstract provided for DE-19853391.
German Search Report dated Nov. 17, 2016 related to German Application No. 10 2016 204 077.4.

* cited by examiner

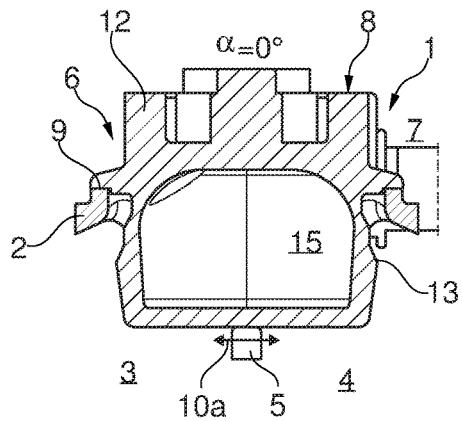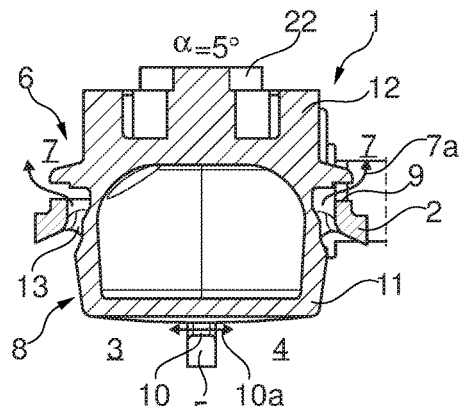
Fig. 1A  Fig. 1B
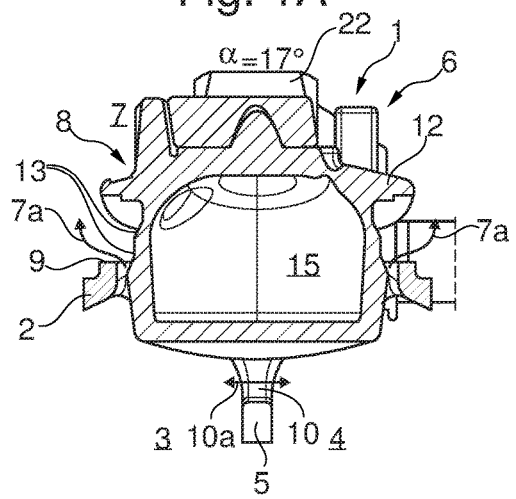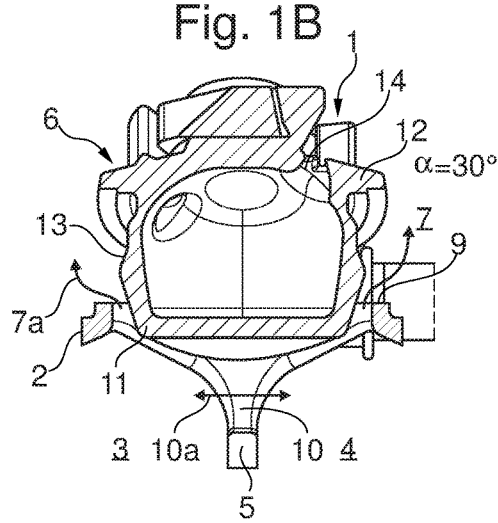
Fig. 1C  Fig. 1D
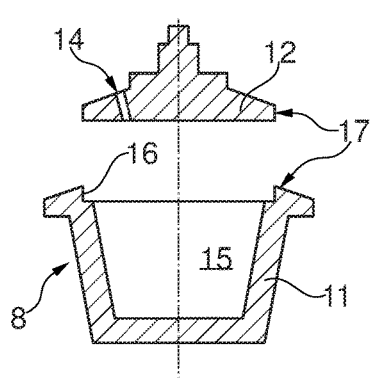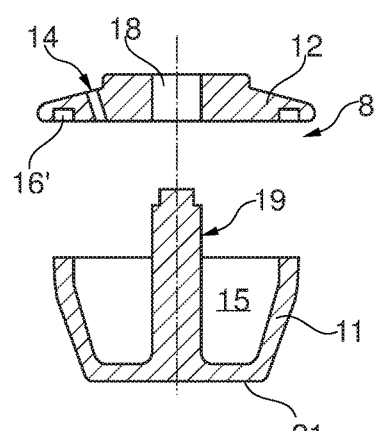
Fig. 2  Fig. 3

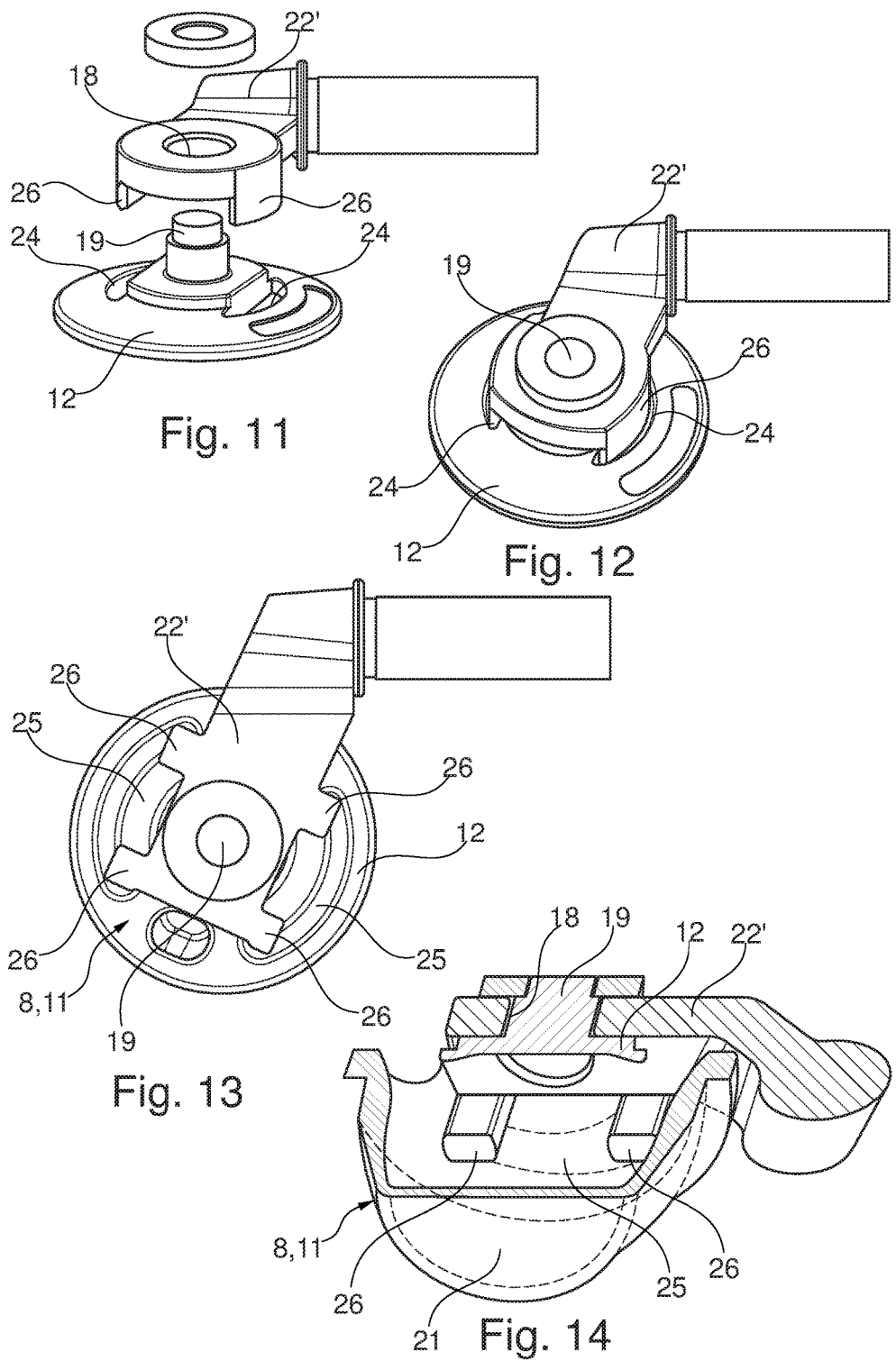

ial design.

EXHAUST-GAS TURBOCHARGER

CROSS-REFERENCE TO RELATED APPLICATIONS

This application claims priority to German Patent Application No. 20 2015 104 843.2, filed May 18, 2015, to German Patent Application No. 10 2015 218 696.2, filed Sep. 29, 2015, and to German Patent Application No. 10 2016 204 077.4, filed Mar. 11, 2016 the contents of which are hereby incorporated by reference in its entirety.

TECHNICAL FIELD

The present invention relates to an exhaust-gas turbocharger with a turbine housing and a turbine arranged therein.

BACKGROUND

GB 2 312 930 A discloses an exhaust-gas turbocharger of the type in question with a turbine housing and a turbine arranged therein, wherein the turbine housing has two exhaust-gas channels which are separated from each other via a partition. Furthermore, a wastegate valve is provided via which the two exhaust-gas channels are connectable to a bypass duct bypassing the turbine.

DE 198 53 391 A1 discloses a wastegate valve for controlling the charge air pressure, in which some of the exhaust gas can be conducted via a bypass past a turbine into an exhaust-gas system. In order to avoid instabilities of the wastegate valve during opening and closing, the valve body is designed in such a manner that a progressively increasing cross section is obtained during the opening operation. For this purpose, the valve body is, for example, of hemispherical design.

US 2005/086936 A1 in turn discloses an exhaust-gas turbocharger with a turbine housing and a turbine arranged therein, wherein the turbine housing has two exhaust-gas channels which are separated from each other via a partition. A wastegate valve is likewise provided via which the two exhaust-gas channels can be connected to a bypass duct bypassing the turbine.

Generally, a differentiation is made in exhaust-gas turbochargers between what is referred to as ram supercharging and pulse supercharging, wherein, in the case of the ram supercharging, the pressure pulsations, which are caused by discharging, of the individual cylinders are smoothed in a single exhaust-gas collecting container. By this means, within the range of high motor rotational speeds, a turbine can put through more exhaust gas at a low pressure. Since it is possible for the motor to discharge counter to a lower exhaust-gas counter pressure, the fuel consumption is reduced in this operating range. However, the comparatively low motor torque at lower rotational speeds has a disadvantageous effect.

In order, at low motor rotational speeds to be able in turn to obtain a large motor torque, use is made of what is referred to as pulse supercharging. In this case, the exhaust gases of the individual cylinders are conducted in individual pipelines to the turbine of the exhaust-gas turbocharger. Owing to small pipe diameters, use is made of the kinetic energy of the exhaust-gas pulsation. The pressure in the lines is not constant here. The individual exhaust-gas lines are also guided separately here within the turbine housing as far as the turbine wheel, which can be achieved, for example, by means of a multi-channel housing.

The invention is therefore concerned with the problem of specifying, for an exhaust-gas turbocharger of the type in question, an improved or at least an alternative embodiment which overcomes disadvantages known from the prior art.

This problem is achieved according to the invention by the subject matter of the independent Claim(s). Advantageous embodiments are the subject matter of the dependent claims.

SUMMARY

The present invention is based on the general concept of designing a wastegate valve in a turbine housing of an exhaust-gas turbocharger in such a manner that both pulse supercharging and ram supercharging are possible via said wastegate valve, and the advantages of both methods can thereby be used and the disadvantages thereof avoided. For this purpose, the exhaust-gas turbocharger according to the invention has, in a known manner, a turbine housing with a turbine arranged therein, wherein the turbine housing has two, in particular spiral, exhaust-gas channels which are separated from each other via a partition. The two exhaust-gas channels can be connected via the wastegate valve to a bypass duct bypassing the turbine. The wastegate valve itself has, according to the invention, a single valve body and a valve seat interacting therewith, and is designed in such a manner that ram supercharging or pulse supercharging is possible depending on the degree of opening of the wastegate valve, that is to say depending on the degree of opening of the valve body. By this means, it is firstly possible to put through more exhaust gas at high rotational speeds and lower exhaust-gas counter pressure and to thereby realize a lower fuel consumption within said operating range. Secondly, at low motor rotational speeds, use can be made of the kinetic energy of the exhaust-gas pulsations in order, even at low motor rotational speeds, to be able to obtain a large motor torque via the pulse supercharging. This is realized by the fact that, at low motor rotational speeds, the wastegate valve is opened merely with a small opening angle and an only small cross section opens between the two exhaust-gas channels while the cross section opened to the bypass duct is larger. At high rotational speeds, the ram supercharging is realized by the fact that the wastegate valve is opened with a larger opening angle and the connecting cross section between the two exhaust-gas channels is larger than a blow-off cross section toward the bypass duct.

The valve seat is expediently arranged at the transition to the bypass duct, and the previously described connecting opening is provided between the two exhaust-gas channels. The valve body here has a conical basic body and a valve collar, wherein, when the wastegate valve is closed, the valve collar rests tightly on the valve seat while the basic body closes the connecting opening. By this means, it is possible, when the wastegate valve is completely closed, to separate the two exhaust-gas channels of the exhaust-gas turbocharger according to the invention preferably completely and thereby to realize ram supercharging. Of course, certain leakage flows, caused by manufacturing tolerances, between the exhaust-gas channels may nevertheless occur without impairing the effect of the ram supercharging.

In a further advantageous embodiment of the solution according to the invention, the basic body of the valve body has lateral cutouts which are designed in such a manner that, at an opening angle $\alpha$ of the valve body of $\alpha$ to approximately 7°, an exhaust-gas flow into the bypass duct is greater than an exhaust-gas flow through the connecting opening, that is to say between the two exhaust-gas channels. By this means, pulse supercharging of the exhaust-gas turbocharger can be realized at low rotational speeds and therefore a small opening angle of the valve body, as a result of which a comparatively large motor torque can be achieved even at low motor rotational speed. Furthermore, the lateral cutouts of the basic body are designed in such a manner that, at an opening angle α of the valve body of α>7° to approx. 25 to 32°, an exhaust-gas flow into the bypass duct is smaller than through the connecting opening. By this means, ram supercharging of the exhaust-gas turbocharger is possible at high rotational speeds, as a result of which use can be made of the advantages of the ram supercharging, that is to say the reduced fuel consumption because of the reduced exhaust-gas counter pressure.

The geometry of the wastegate valve is designed here in such a manner that, in a first opening angle range A of the valve body, an exhaust-gas flow into the bypass duct is greater, and in a second opening angle range B, which adjoins the first opening angle range A, of the valve body is smaller than the exhaust-gas flow through the connecting opening. The first opening angle range A of the valve body can lie here within the range of 0°<A<approx. 7° while the second opening angle range B of the valve body lies within the range of approx. 7°<B<32°. At α is approx. 32°, the exhaust-gas stream into the bypass duct and through the connecting opening is approximately identical in size. In the event of an opening angle α of the valve body that goes therebeyond, the exhaust-gas flow into the bypass duct is again greater than the exhaust-gas flow flowing through the connecting opening.

In a further advantageous embodiment of the exhaust-gas turbocharger according to the invention, the valve body is designed as a single-piece, cast hollow profile. This permits an economical and high-quality design of the valve body, wherein use can be made as the core of a ceramic core which is etched out in a later method step. Alternatively, of course, sand or salt cores are also conceivable. Furthermore, the design in the form of a hollow profile makes it possible to achieve a comparatively low weight of the entire valve body, as a result of which the latter requires lower adjustment forces for the adjustment and at the same time has lower bearing forces and therefore lower wear.

Alternatively thereto, it is also conceivable for the valve body to be formed from a plurality of parts, in particular as a hollow profile which is constructed from the valve collar and the basic body, wherein the basic body and the valve collar are welded to each other. By this means, a cost-effective, weight-reduced design of the valve body can likewise be realized.

The wastegate valve expediently has a cranked spindle arm which permits rotation of the valve body level with the valve seat, that is to say a pivot point or an axis of rotation of the spindle arm lies level with the valve seat. Furthermore, the entry body, that is to say the basic body in this case, is kept at least slightly conical, as a result of which particularly reliable and collision-free entry is possible. The basic body is designed here preferably in a tapering manner from cylindrical to elliptically conical in order to keep the blow-off behaviour approximately constant at opening angles of approx. 7° to 23°.

In a further advantageous embodiment of the solution according to the invention, the valve body is of round design in the region of the valve collar and has an elliptical shape at its free end facing away from the valve collar. At an opening angle α of the valve body of approximately 7° to at least 25° to 32°, a blow-off behaviour at a consistently low level is thereby achieved.

The valve body can be designed as part of a swinging flap. Alternatively, the valve body can be designed as part of a plunger valve.

Further important features and advantages of the invention emerge from the dependent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and are explained in more detail in the description below, wherein the same reference signs relate to identical or similar or functionally identical components.

BRIEF DESCRIPTION OF THE DRAWINGS

In the drawings, in each case schematically,

FIG. 1A shows a sectional illustration through a wastegate valve according to the invention in the closed state, FIG. 1B shows an illustration as in FIG. 1A, but at an opening angle α of the wastegate valve or of a valve body of the wastegate valve of 5°, FIG. 1C shows an illustration as in FIG. 1B, but at an opening angle α of, for example 17°, FIG. 1D shows an illustration as in FIG. 1C, but at an opening angle α of 30°, FIG. 2 shows a sectional illustration through a further possible embodiment of the valve body, FIG. 3 shows an illustration as in FIG. 2, but for another embodiment, FIG. 11 shows an exploded illustration of a spindle arm and valve collar, which can be arranged thereon, with means for securing against rotation, FIG. 12 shows an illustration as in FIG. 11, but in the mounted state, FIG. 13 shows a top view of a further embodiment of a means for securing a valve body against rotation on the spindle arm, FIG. 14 shows a sectional illustration through FIG. 13.

DETAILED DESCRIPTION

According to FIGS. 1A to 1D, an exhaust-gas turbocharger 1 according to the invention has a turbine housing 2 with a turbine which is arranged therein, but is not shown.

Figure 9:
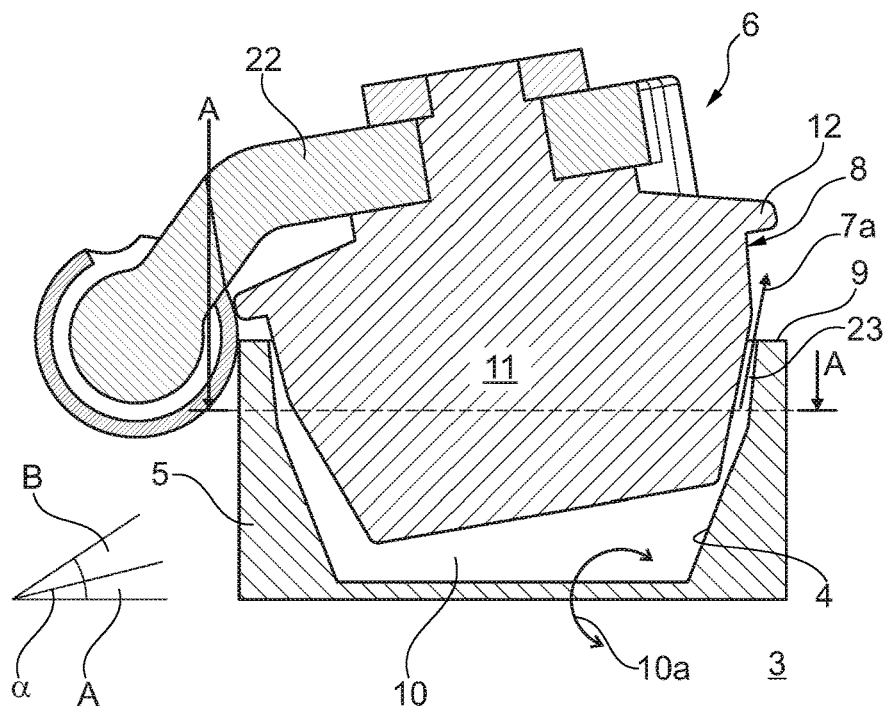
FIG. 9 shows a sectional illustration in the region of the (channel) connecting opening when the wastegate valve is open (opening angle 20°)

The turbine housing 2 has two exhaust-gas channels 3, 4 which are separated from each other via a partition 5. In order to control the power of the exhaust-gas turbocharger 1, a wastegate valve 6 is provided via which the two exhaust-gas channels 3, 4 are connectable to a bypass duct 7 bypassing the turbine. According to the invention, the wastegate valve 6 now has a single valve body 8 and a valve seat 9 interacting therewith and is designed in such a manner that ram supercharging (cf. FIGS. 1C and 1D) or pulse supercharging (cf. FIG. 1A) is possible depending on the degree of opening (depending on the operating point), that is to say depending on the opening angle $\alpha$ of the wastegate valve 6 or of the valve body 8. The valve seat 9 is arranged here at the transition between the exhaust-gas channels 3, 4 to the bypass duct 7, wherein a connecting opening 10 is provided between the two exhaust-gas channels 3, 4, the cross section of which connecting opening can be varied by the valve body 8. In FIG. 9, the connecting opening 10 between the exhaust-gas channels 3, 4 is illustrated in cross section with the wastegate valve 6 open (opening angle 20°).

If the valve body 8 according to FIGS. 1 to 6 and 8 is viewed more precisely, it can be seen that said valve body has a conical basic body 11 and a valve collar 12, wherein, when the wastegate valve 6 is closed, the valve collar 12 rests tightly on the valve seat while the basic body 11 closes the connecting opening 10. The conical design of the basic body 11 makes it easier to insert same through the valve seat opening without a collision.

Figure 8:
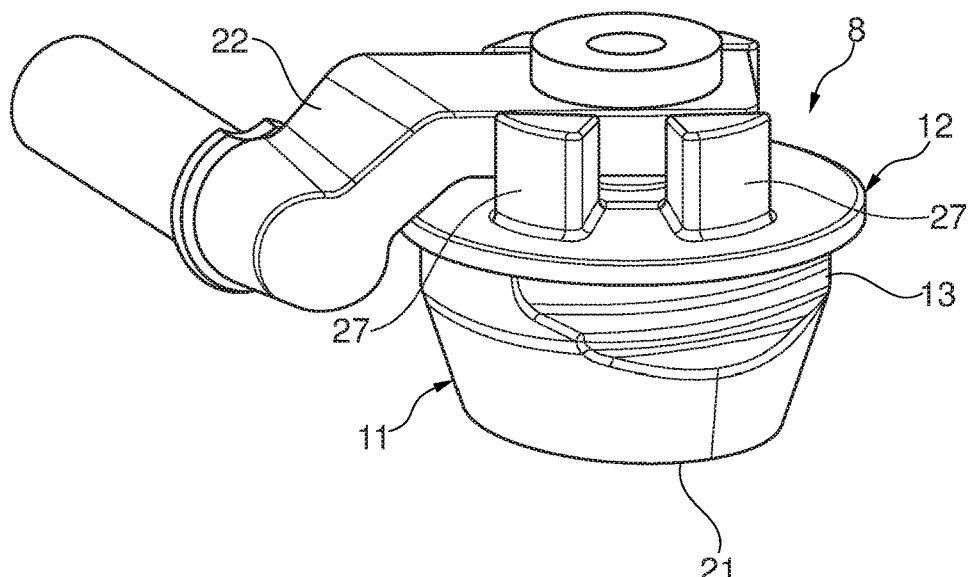
FIG. 8 shows a view of a wastegate valve with a cranked spindle arm and a valve body, which is arranged thereon, with cutouts.

The basic body 11 furthermore has lateral cutouts 13 (cf. in particular FIGS. 1 and 8, which permit the production of the pulse supercharging depending on the opening angle $\alpha$ of the wastegate valve 6. The lateral cutouts 13 on the basic body 11 improve the blow-off behaviour at a small opening angle of $\alpha<7°$.

If the valve body 8 of the wastegate valve 6 is viewed in more detail, different possible embodiments or production methods follow for the valve body 8. In FIGS. 1A to 1D and 4A to 4D, a valve body 8 is designed as a single-piece, cast hollow profile which can be realized in terms of casting for example via an expendable core. An expendable core of this type can be provided as a ceramic core which is etched out later, or by means of a sand or salt core. For the casting process itself, at least one opening 14 is provided on the valve collar 12 in a manner passing through the latter and connecting a cavity 15 of the valve body 8 to the outside. Alternatively, two such openings 14 are provided. The opening can serve for removing the core during the casting process. As an alternative thereto, the valve body 8 can also be designed as a hollow profile constructed from the valve collar 12 and the basic body 11, wherein the basic body 11 and the valve collar 12 are welded to each other. For this purpose, for example, an annular groove 16 (cf. FIG. 2) in which the valve collar 12 engages or is embedded is arranged on the basic body 11. A weld seam 17 is then provided along the annular groove 16. As an alternative thereto in turn, the valve collar 12 may also, of course, have an annular groove 16' (cf. FIGS. 3 and 6) in which the basic body 11 engages or is embedded. The provision of an annular weld seam 17 subsequently also follows here.

As an alternative thereto, it is also conceivable, purely theoretically, to design the valve body 8 as a solid profile, i.e. with basic body 11 and valve collar 12 formed as a single piece, as is illustrated according to FIG. 9.

If the valve body 8 according to FIG. 3 is viewed, it can be seen that the valve collar 12 has a central through opening 18 and the basic body 11 has a central pin 19 formed in a complementary manner with respect to said through opening, wherein the basic body 11 and the valve collar 12 are welded to each other in the region of the pin 19 and the through opening 18.

Figure 4A:
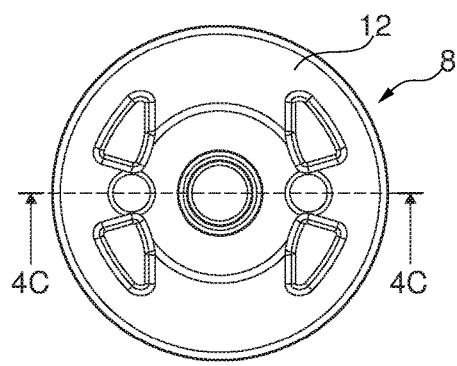
FIGS. 4A to 4D show top views (FIGS. 4A and 4B) and sectional illustrations (FIGS. 4C and 4D) along different sectional planes through a single-piece, cast valve body.
Figure 4B:
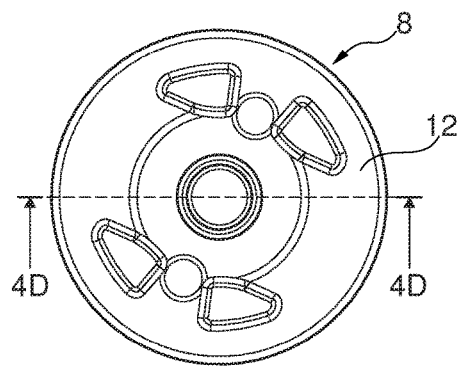
Figure 4C:
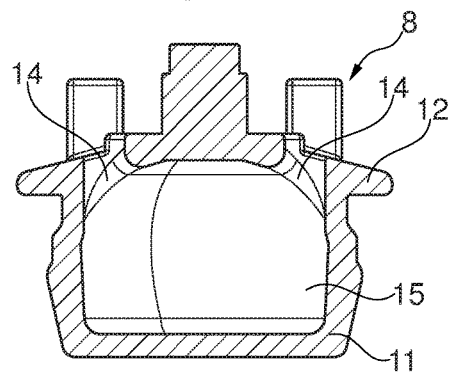
Figure 4D:
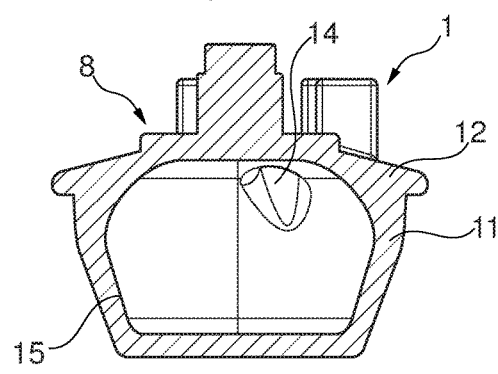
Figure 5:
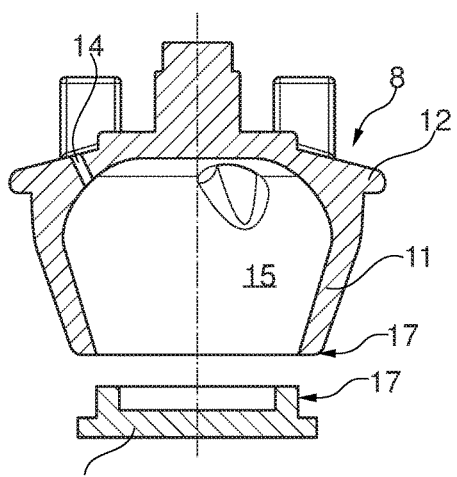
FIGS. 5 and 6 show a further sectional illustration through different embodiments of a valve body according to the invention.
Figure 6:
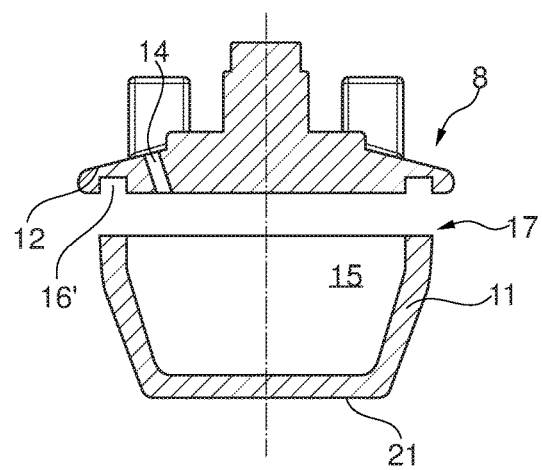

In the case of the valve body 8 which is illustrated according to FIG. 5, said valve body comprises the valve collar 12, the basic body 11 and a separate cover 20, wherein the basic body 11 and the valve collar 12 are designed as a single piece and are welded to the cover 20. A common feature of all of the embodiments here is that a ventilation opening or in general an opening 14 is always provided in the valve collar 12, said ventilation opening or opening connecting the cavity 15 in the basic body 11 to the environment or to the bypass duct 7. In the case of vacuum welding of a multipart valve body 8, the opening 14 can serve for evacuating the air.

Figure 10:
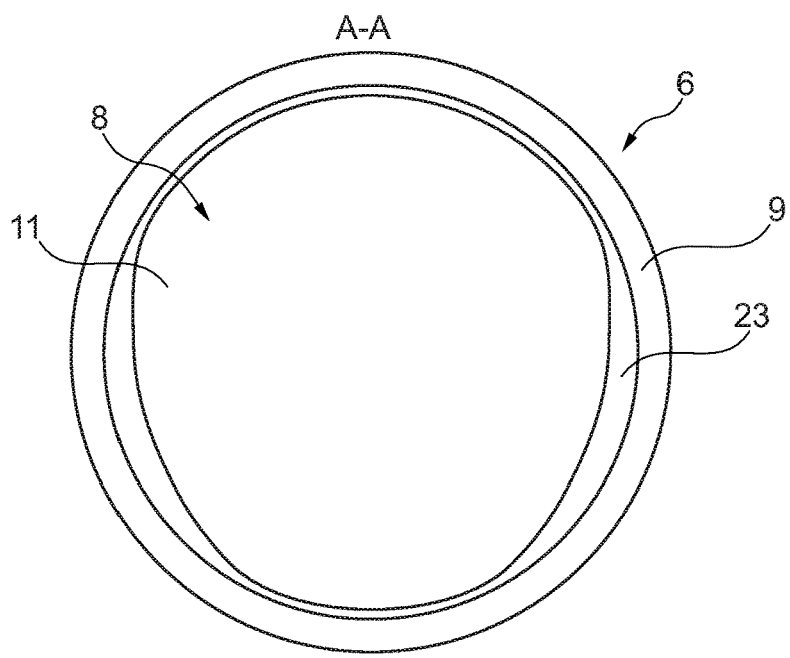
FIG. 10 shows a sectional illustration, with the wastegate valve open, along the section plane A-A from FIG. 9, wherein the section plane A-A lies 0.1 mm below the valve seat in the turbine housing.

As is apparent from FIG. 10, the turbine-housing-side valve seat 9 is of rotationally symmetrical design for reasons of simpler manufacturability. If the illustration of the valve body 8 according to FIG. 8 is also viewed, it can be seen that the basic body 11 or the valve body 8 is of round design in the region of the valve collar 12 and has an elliptical shape at its free end 21 facing away from the valve collar 12. At an opening angle $\alpha$ of the valve body 8 of approximately 10° to 30°, a blow-off behaviour (exhaust-gas stream 7a) at a consistently low level is thereby achieved. In FIG. 10, the clearance 23 arising because of the elliptical profile of the basic body 11 can also be very readily seen.

Furthermore, it can be seen from FIGS. 1 and 8 that the wastegate valve 6 has a cranked spindle arm 22 which permits a rotation of the valve body 8 level with the valve seat 9. A collision-free entry and exit of the basic body 11 into/from the turbine housing 2 or the valve seat 9 can thereby also be made possible.

The functioning of the wastegate valve 6 according to the invention will be explained more precisely below.

Figure 7:
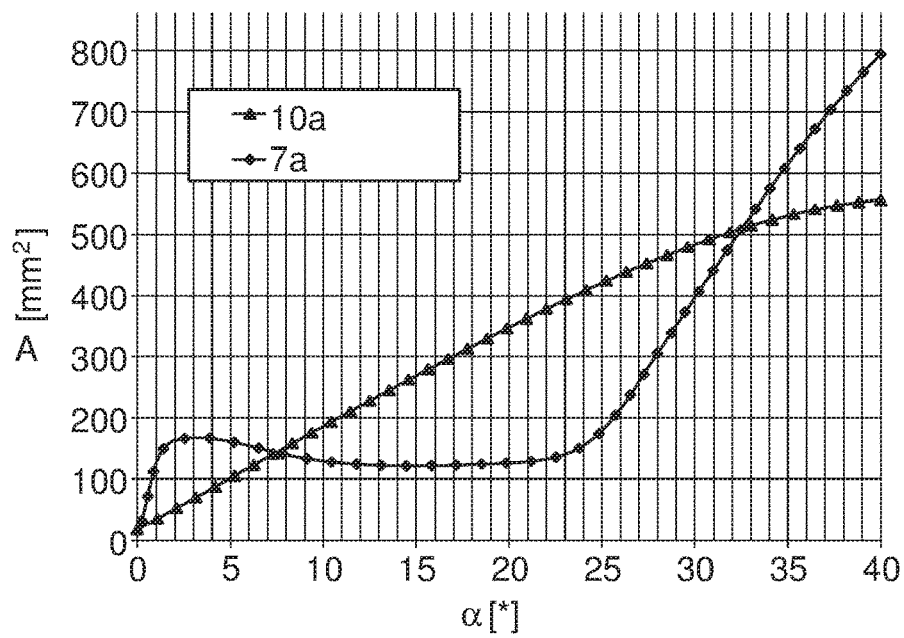
FIG. 7 shows a diagram of a flow cross section opening angle.

If FIG. 1A is viewed in conjunction with FIG. 7, it can be seen that, at an opening angle $\alpha$ of 0°, the valve collar 12 rests tightly on the valve seat 9 on the turbine housing 2 and therefore prevents an exhaust-gas flow 7a flowing from the exhaust-gas channels 3, 4 in the direction of the bypass duct 7 (cf. FIG. 7). As can furthermore be gathered, however, from FIG. 1A, an exhaust-gas stream 10a via the connecting opening 10 is also not avoidable when the wastegate valve 6 is completely closed since the basic body 11 cannot completely close the connecting opening 10 because of manufacturing tolerances.

If the valve body 8 is then opened, it can be seen according to FIG. 7 that, up to an opening angle of $\alpha$ being approximately 7°, the exhaust-gas stream 7a flowing off via the valve seat 9 is greater than the exhaust-gas stream 10a flowing through the connecting opening 10. Owing to the cutouts 13, the exhaust-gas stream 7a flowing into the bypass duct 7 first of all increases steeply up to an opening angle $\alpha$ of approx. 2° and then falls away slowly again. At an opening angle $\alpha$ of approx. 7°, the exhaust-gas flow 10a flowing through the connecting opening 10 should substantially correspond to the exhaust-gas flow 7a. The exhaust-gas stream 10a customarily rises virtually continuously here between an opening angle $\alpha$ of 0 and 40°. At an opening angle $\alpha$ of the valve body 8 of approx. $7°<\alpha<$approx. 32°, an exhaust-gas flow 7a into the bypass duct 7 is smaller than the exhaust-gas stream 10a flowing through the connecting opening 10. That is to say, at comparatively small opening angles $\alpha$ of up to approx. 7°, the blowing-off is more pronounced than the exhaust-gas stream 10a flowing through the connecting opening 10, that is to say the channel connection.

At an opening angle α of approx. 32°, the two exhaust-gas streams 7a and 10a are in turn substantially equal in size. At an opening angle α, which goes therebeyond, of the valve body 8, the exhaust-gas flow 7a into the bypass duct 7 is greater than the exhaust-gas flow 10a flowing through the connecting opening 10. By means of the geometry according to the invention of the valve body 8, in particular the lateral cutouts 13, it is therefore possible, at low rotational speeds and, as a result, at small opening angles (α<approx. 7°), to obtain as small an exhaust-gas stream 10a as possible flowing through the connecting opening 10 and an exhaust-gas stream 7a which is comparatively greater with respect thereto flowing through the valve seat 9 into the bypass duct 7, as a result of which pulse supercharging can be achieved. By contrast, at higher rotational speeds and therefore also at larger opening angles α, the flow cross section between the exhaust-gas channels 3, 4 is increased and the exhaust-gas flow 7a into the bypass duct 7 is reduced, wherein the flow cross section available via the connecting opening 10 is relatively significantly larger and therefore permits an exhaust-gas stream 10a which is significantly increased in comparison to the exhaust-gas stream 7a. By this means, ram supercharging can be realized within a region of, for example, 7°<α<approx. 32°. Both the pulse supercharging and the ram supercharging can be realized here with a wastegate valve 6 with only a single valve body 8 to be actuated, singularly and solely via the geometry according to the invention of the entry body, in particular the provided lateral cutouts 13.

It therefore applies in general that, in a first opening angle range A of the valve body, an exhaust-gas flow into the bypass duct is greater than an exhaust-gas flow through the connecting opening and, as a result, pulse supercharging can be realized, while, in a second opening angle range B, which adjoins the first opening angle range A, of the valve body the exhaust-gas flow into the bypass duct is smaller than the exhaust-gas flow through the connecting opening and, as a result, ram supercharging can be realized. The first opening angle range A of the valve body lies here within the range of 0°<A<approx. 7°, and the second opening angle range B of the valve body (8) lies within the range of approx. 7°<B<32°, in particular 7°<B<25°.

In order to avoid the valve body 8 or in general a flap plate rotating because of the flow of the exhaust gas, a means of securing against rotation is provided. Without such a means, the frictional wear may be of such a high level that component failure occurs. In any case, such means of securing against rotation are imperative in the case of valve bodies 8 which do not have a symmetrical contour, in order to avoid jamming. In the case of turbine housings 2 with two exhaust-gas channels 3, 4, means of securing against rotation having more than one arm 26 and an associated depression 24 or opening 25 have proven more robust and resistant to wear.

If FIGS. 11 to 14 are viewed, such a means of securing against rotation can be seen there, for the realization of which the wastegate valve 6 has a spindle arm 22' on which at least one arm 26 is integrally formed, said arm engaging in an associated depression 24 (cf. FIGS. 11 and 12) of a valve collar 12 or of a valve body 8 or an opening 25 in the valve body 8 on the valve collar 12 thereof. The depressions 24 or the openings 25 are already produced during the casting process. The means of securing against rotation that are shown according to FIGS. 11 and 12 have the advantage that there is more material around the through opening 18 because of the arms 26, which are formed in the shape of circular segments.

The means of securing against rotation that are shown in FIGS. 11 to 14 have the advantage here of being compact in construction and being able to be arranged in a space-saving manner. Furthermore, the machining of a pin 19 is simpler since there are no interfering rotational stops. In addition, an at least slight saving on material can also be achieved with the means of securing against rotation that are shown. The means of securing against rotation that are shown in FIGS. 11 to 14 furthermore afford the advantage that better core securing during the casting of the valve body 8 is possible since attached rotational stops 27 (cf. FIG. 8) can seal the holding pins protruding from the ceramic core or are not useable in the region in the vicinity of the core.

With the wastegate valve 6 according to the invention and the exhaust-gas turbocharger 1 according to the invention, the advantages of ram supercharging (lower exhaust-gas counter pressure and lower fuel consumption of the motor at a high motor rotational speed) can be realized with those of pulse charging (high motor torque at low motor rotational speeds) in a single exhaust-gas turbocharger 1.

The invention claimed is:

1. An exhaust gas turbocharger, comprising:
a turbine housing and a turbine arranged in the turbine housing, the turbine housing includes at least two exhaust gas channels that are separated from each other via a partition;
a connecting opening;
a wastegate valve arranged such that the at least two exhaust gas channels are connectable to a bypass duct bypassing the turbine, wherein the wastegate valve includes a single valve body and a valve seat interacting therewith, and wherein the wastegate valve is structured and arranged such that at least one of a ram supercharging operation and a pulse supercharging operation is activated depending on a degree of opening of the wastegate valve;
the single valve body including a conical basic body and a valve collar, the valve collar rests on the valve seat and the conical basic body at least partially closes the connecting opening when the wastegate valve is closed;
wherein at least one of the valve seat is arranged at a transition to the bypass duct, and the connecting opening is arranged between the at least two exhaust gas channels; and
wherein the conical basic body has lateral cutouts structured and arranged such that an exhaust gas flow into the bypass duct is greater than an exhaust gas flow through the connecting opening when the single valve body defines an opening angle of up to approximately 7°.

2. The exhaust gas turbocharger according to claim 1, the valve seat is arranged at the transition to the bypass duct, and the connecting opening is arranged between the at least two exhaust gas channels.

3. The exhaust gas turbocharger according to claim 1, the conical basic body completely closes the connecting opening subject to manufacturing tolerances when the wastegate valve is closed.

4. The exhaust gas turbocharger according to claim 1, wherein said lateral cutouts are disposed on the conical basic body between the valve collar and a free end of the conical basic body facing away from the valve collar, and wherein the wastegate valve activates the pulse supercharging operation when the opening angle defined by the single valve body is approximately 7° or less.

5. The exhaust gas turbocharger according to claim 1, wherein the lateral cutouts are structured and arranged such that, when the opening angle of the single valve body is approximately 17°, the exhaust gas flow into the bypass duct is smaller than the exhaust gas flow through the connecting opening.

6. The exhaust gas turbocharger according to claim 1, wherein the single valve body has a geometry such that, when the opening angle of the single valve body is approximately 30°, the exhaust gas flow into the bypass duct is smaller than the exhaust gas flow through the connecting opening.

7. The exhaust gas turbocharger according to claim 1, wherein the wastegate valve further includes a cranked spindle arm that permits rotation of the single valve body at a position level with the valve seat.

8. The exhaust gas turbocharger according to claim 1, wherein the wastegate valve has a geometry such that:
    in a first opening angle range of the single valve body corresponding to the opening angle of up to approximately 7°, the exhaust gas flow into the bypass duct is greater than the exhaust gas flow through the connecting opening; and
    in a second opening angle range of the single valve body adjoining the first opening angle range, the exhaust gas flow into the bypass duct is smaller than the exhaust gas flow through the connecting opening.

9. The exhaust gas turbocharger according to claim 8, wherein the first opening angle range is between 0° and approximately 7°, and the second opening angle is between approximately 7° and 32°.

10. The exhaust gas turbocharger according to claim 9, wherein the second opening angle range is between 7° and 25°.

11. The exhaust gas turbocharger according to claim 1 wherein:
    the single valve body is configured as a single piece having a cast hollow profile, or
    the single valve body is configured as a hollow profile formed from the valve collar and the conical basic body, wherein the conical basic body and the valve collar are welded to each other.

12. The exhaust gas turbocharger according to claim 11, wherein, when the single valve body is configured as the hollow profile,
    the conical basic body has an annular groove in which the valve collar engages, or
    the valve collar has an annular groove in which the conical basic body engages.

13. The exhaust gas turbocharger according to claim 11, wherein, when the single valve body is configured as the hollow profile, the valve collar has a central through opening and the conical basic body has a pin disposed complementary to the central through opening, and wherein the conical basic body and the valve collar are welded to each other in a region of the pin and a region of the central through opening.

14. The exhaust gas turbocharger according to claim 1, wherein the single valve body has the valve collar, the conical basic body and a cover, and wherein the conical basic body and the valve collar are configured as a single piece and are welded to the cover.

15. The exhaust gas turbocharger according to claim 1, wherein the single valve body defines a cavity connected to an external environment via at least one opening passing through the valve collar.

16. The exhaust gas turbocharger according to claim 1, wherein the wastegate valve further includes a spindle arm on which at least one arm is arranged, wherein the at least one arm engages in an associated depression in the single valve body to secure against rotation.

17. The exhaust gas turbocharger according to claim 16, wherein the associated depression is an opening in the single valve body.

18. The exhaust gas turbocharger according to claim 16, wherein the associated depression is disposed in a valve collar of the single valve body.

19. An exhaust gas turbocharger, comprising:
    a turbine housing;
    a turbine arranged in the turbine housing, wherein the turbine housing includes at least two exhaust gas channels and a partition separating the at least two exhaust gas channels from each other;
    a wastegate valve arranged such that the at least two exhaust gas channels are connectable to a bypass duct bypassing the turbine, wherein the wastegate valve includes a valve body and a valve seat interacting with the valve body, the valve body including a conical basic body and a valve collar, and wherein the wastegate valve is structured and arranged such that at least one of a ram supercharging operation and a pulse supercharging operation is activated in response to a degree of opening of the wastegate valve;
    wherein the valve seat is arranged at a transition to the bypass duct, and a connecting opening is disposed between the at least two exhaust gas channels, wherein the valve collar rests on the valve seat and the conical basic body at least partially closes the connecting opening when the wastegate valve is closed; and
    wherein the conical basic body has a round shape in a region of the valve collar and has an elliptical shape at a free end facing away from the valve collar.

20. An exhaust gas turbocharger, comprising:
    a turbine housing;
    a turbine arranged in the turbine housing, the turbine housing including at least two exhaust gas channels separated from each other via a partition;
    a wastegate valve arranged such that the at least two exhaust gas channels are connectable to a bypass duct bypassing the turbine, the wastegate valve including a valve body and a valve seat interacting with the valve body, the valve body including a conical basic body and a valve collar, and wherein the wastegate valve is structured and arranged such that at least one of a ram supercharging operation and a pulse supercharging operation is activated in response to a degree of opening of the wastegate valve;
    wherein the valve seat is arranged at a transition to the bypass duct, and a connecting opening is disposed between the at least two exhaust gas channels, wherein the valve collar rests on the valve seat and the conical basic body at least partially closes the connecting opening when the wastegate valve is closed; and
    wherein the valve body defines a cavity connected to an external environment via at least one opening passing through the valve collar.

* * * * *